ENCODER

INVENTORS
DAVID H. BLAUVELT
WALTER W. LEE
ARTHUR S. ROBINSON
BY Charles J. Worth
AGENT June 7, 1966 A. S. ROBINSON ETAL 3,255,338

ENCODER

Filed Dec. 16, 1960 2 Sheets-Sheet 2

INVENTORS
DAVID H. BLAUVELT
WALTER W. LEE
ARTHUR S. ROBINSON
BY Charles J. Worth
AGENT United States Patent Office 3,255,338

Patented June 7, 1966

3,255,338
ENCODER

Arthur S. Robinson, Allendale, David H. Blauvelt, Ridgewood, and Walter W. Lee, Allendale, N.J., assignors to The Bendix Corporation, Teterboro, N.J., a corporation of Delaware Filed Dec. 16, 1960, Ser. No. 76,244
15 Claims. (Cl. 235—61.6)

This invention relates to an encoder having a circuit for converting stored coded data to a digital number as a function of two variables.

The need for circuits of this type is becoming more acute in systems requiring advanced computing capabilities according to special purpose computing techniques. The specific characteristics of the circuit will, of course, depend on its application and on the characteristics of the system with which it will mesh.

An object of this invention is to provide an encoder to provide data in digital form as a function of two variables.

Another object of this invention is to provide an encoder having a circuit receiving a digital address representing two variables for converting stored data to an output in digital form as a function of the variables and to provide an output availability signal.

Another object of this invention is to provide compact, light weight, high density permanent storage of information in digital form.

Another object of this invention is to provide an encoder having a high density coded data optical storage member.

Another object of this invention is to provide an encoder with digital servo or comparing means for searching stored coded data.

Another object of this invention is to provide an encoder with a driven storage member which operates independently of the speed of the driven member, and which is accurate and has a high degree of resolution.

This invention contemplates an encoder having an input to receive two variables, storage means having data according to functions of the variables and means for scanning the storage member to provide a signal. The scanning means has control means responsive to one of the variables so the signal corresponds to a function of the one variable. Signal transmitting means is connected to the scanning means to provide an output signal, and has control means responsive to the other variable so the output signal corresponds to a function of the two variables.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 1:
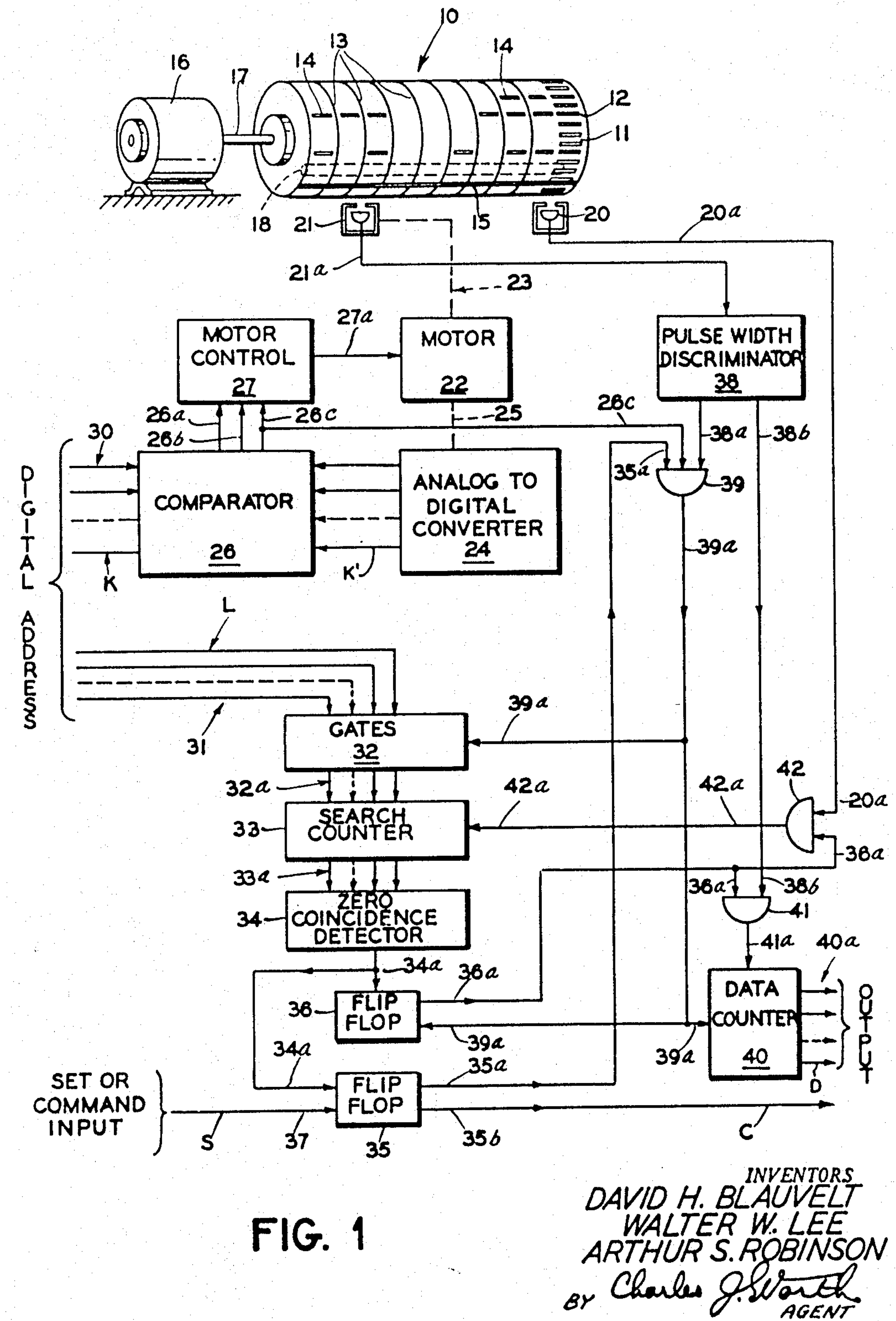
Figures 2, 3:
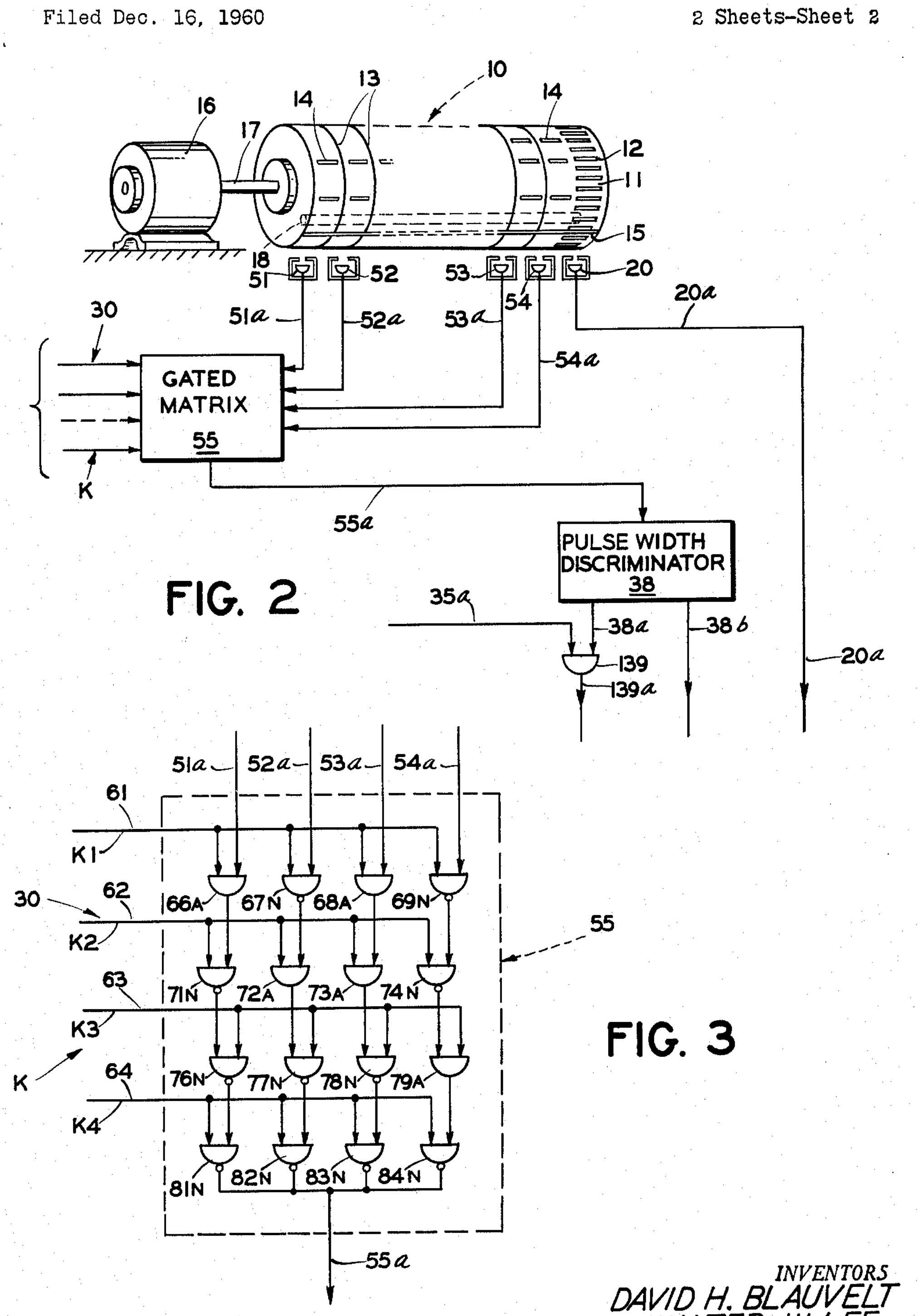

FIGURE 1 is a diagrammatic showing of a novel circuit constructed according to the invention for providing a digital output as a function of two variables represented by a digital address, FIGURE 2 is a diagrammatic showing of a modification of the scanning and scanning control means of FIGURE 1; and, FIGURE 3 is a circuit diagram of the gated matrix of FIGURE 2.

The circuit address can be a digital number comprising the most significant digits K and the least significant digits L, or two separate digital numbers of K and L digits, respectively. Parallel digital transmission lines have been limited in number merely to facilitate illustration and description. The digits of the circuit address can be provided in series or in parallel with the K digits being applied to input 30 and the L digits being applied to input 31. Similarly, the circuit output is a digital number of digits D that also can be provided in series or in parallel at output 40*a*. The advantages and disadvantages of digital numbers provided in series and in parallel are well-known by those skilled in the art. Therefore, the manner in which the address and output are provided is determined by the system in which the circuit is employed. For purposes of illustration and description, the novel circuit is described as having means to receive a parallel digital address and to provide a parallel digital output.

The circuit receiving address digits K and L uses a servo or comparing means for providing the desired digital output data D. This will be readily understood by referring to FIGURE 1 of the drawings of the novel circuit based on a miniaturized high precision incremental or coded data optical storage member 10. Member 10 has a clock track 11 of linearly spaced transparent marks or bits 12 to provide clock pulses, and a plurality of parallel data tracks 13 of nonlinearly spaced transparent marks or bits 14 that are scanned by means including sensors 20 and 21 to provide clock and coded data pulses. The data of each of the tracks 13 differs from the data of the other tracks 13 according to functions of the variables represented by the digital address. A heavy transparent reference mark or bit 15 extends axially on member 10 and across all the tracks 11 and 13 to provide reference pulses.

Optical member 10 may be of drum or disc form with transparent bits on an opaque base, or vice versa. The stored information of member 10 is merely indicated in the drawings with no intent towards a true showing because typical high storage densities for an optical storage member of this kind are 500 tracks or channels per inch and 1000 pulse marks or bits per inch of track. The information may be applied to an optical member 10 with facility by photographic reproduction methods which at present enable the use of $10^8$ bits per inch.

A light source 18 is disposed within the member 10 to provide light rays that pass through transparent marks or bits 12 of clock track 11 and impinge on a fixed sensor 20 to derive clock pulses in line 20*a*. Rays from light source 18 also pass through transparent marks or bits 14 of all the tracks 13 and reference mark or bit 15 and impinge on a movable sensor 21, according to the track 13 in alignment with sensor 21, to derive selected data and reference pulses in line 21*a* as member 10 rotates. Member 10 is mounted on a shaft 17 of a motor 16 for rotation thereby.

The scanning means has a digital servo or control for aligning the movable sensor 21 with a desired track 13 that will now be described. A motor 22 is connected by mechanical means 23 to sensor 21 for moving the sensor axially along member 10 for selective and precise alignment with a track 13 to be scanned. Alignment problems can be alleviated by using a step motor to move sensor 21 with steps equal to the distance from one track 13 to the next.

The input 30 receives the most significant digits K of the address, representing one variable and specifying the track 13 to be scanned by sensor 21, that are applied to a digital comparator 26. An analog to digital converter 24 is connected by mechanical means 25 to the motor 22 and provides a digital number of digits K′ to the comparator 26 which may be of the kind shown at page 137 of Digital Computer and Control Engineering by Robert S. Ledley, published by McGraw-Hill Publishing Co. (1960), that identifies or represents the instantaneous location or track alignment of sensor 21. Comparator 26 compares digits K and K', and provides a directional control signal to a motor control 27 by its output line 26a or 26b when the digits K and K' are not coincident. Motor control 27 energizes motor 22 by its output line 27a, in response to the signal provided by comparator 26, for driving the sensor 21 into alignment with the track 13 specified by digits K. The analog to digital convertor 24 is simultaneously driven by the motor 22 through mechanical means 25 and provides a changing signal of digits K' to comparator 26 that represents the changing location of sensor 21. When sensor 21 is driven to align with a specified track 13 or to a commanded location according to digits K received at input 30, the analog to digital converter 24 provides digits K' coincident to digits K and comparator 26 provides a null signal to motor control 27 and to an AND gate 39 by a line 26c. Motor control 27 no longer energizes motor 22 and sensor 21 remains in its commanded track alignment position. The digital control may be of the kind shown and described at pages 742 to 744 of the above publication.

The input 31 receives the least significant digits L of the address, representing the other variable and specifying the location of the information on the specified track 13 or the portion of the track to be scanned, that are applied to a bank of gates 32. The bank of gates 32 has output lines 32a for applying digits L to a search or digital counter 33 in response to a qualifying signal. Counter 33 has an output 33a for providing signals to a zero coincidence detector 34 having a divided output line 34a connected to the "reset" inputs of two flip flops 35 and 36.

Flip flop 35 has an input line 37 connected to its "set" input to receive a search command input signal S, and two output lines 35a and 35b. Line 35a is connected to the input of AND gate 39, and line 35b provides a search complete or output availability signal C when circuit operation is complete. AND gate 39 has an output line 39a connected to the qualifying input of the bank of gates 32, the "set" inputs of flip flop 36 and a digital data pulse counter 40. Flip flop 36 has an output line 36a connected to the input of two AND gates 41 and 42. AND gates 41 and 42 have respective outputs 41a and 42a connected to the inputs of data counter 40 and search counter 33, respectively. The data counter 40 has an output 40a for the resulting digital data output signal of digits D.

Clock pulses derived by fixed sensor 20 are applied to the input of AND gate 42 by line 20a. Data and reference pulses derived by movable sensor 21 are applied to a pulse width discriminator 38 by line 21a. Pulse width discriminator 38 has an output line 38a connected to the input of AND gate 39 for transmitting reference pulses, and an output line 38b connected to the input of AND gate 41 for transmitting data pulses.

In operation, motor 16 rotates member 10 at a constant speed so the clock track 11 and a data track 13 are scanned by sensors 20 and 21, respectively, to derive clock and data pulses. A K and L digit address is provided to inputs 30 and 31, respectively. The most significant digits K are applied to comparator 26 and specify a desired track 13 of member 10 having stored coded data. The least significant digits L are applied to corresponding gates of the gate bank 32 and specify the portion of the desired track 13 to be scanned.

The scanning control circuit is generally a servo arrangement wherein comparator 26 compares the K digits from input 30 representing the commanded location to the K' digits from the analog to digital converter 24 representing the instantaneous location of the movable sensor 21, and provides a directional signal to motor control 27 by line 26a or 26b when digits K and K' are not equal. Motor control 27 energizes motor 22 in response to the direction scanning control signal from comparator 26 to drive sensor 21 axially along member 10 and to simultaneously adjust converter 24. When the adjusted converter 24 provides digits K' coincident with digits K, comparator 26 provides a null signal to motor control 27 that is a gating signal to AND gate 39. Motor control 27 de-energizes motor 22 and sensor 21 is in its commanded track aligned location.

When a start search command signal S is applied to the "set" input of flip flop 35 by line 37, flip flop 35 applies a gating voltage by line 35a to AND gate 39. Voltage from flip flop 35 and the null signal from comparator 26 qualifies AND gate 39 to pass the next reference pulse applied to the pulse width discriminator 38. As member 10 rotates sensor 21 derives data and reference pulses, in response to light rays from source 18 passing through the data and reference bits 14 and 15 that are applied to the pulse width discriminator 38 by line 21a. Simultaneously, sensor 20 scans track 11 and derives clock pulses, in response to light rays from source 18 passing through bits 12, that are applied to the disqualified AND gate 42 and are blocked thereby. The first reference pulse applied to discriminator 38 after AND gate 39 is qualified by the null signal from comparator 26 and the signal voltage from flip flop 35, provides a pulse in the discriminator output line 38a that is applied to and transmitted by AND gate 39. The pulse transmitted by AND gate 39 is applied to the qualifying input of the bank of gates 32, and to the "set" inputs of flip-flop 36 and the data counter 40.

The reference pulse from AND gate 39 simultaneously qualifies all the gates of the bank of gates 32 to pass the L digits, representing the other variable, to set a count corresponding to the L digits in search counter 33, sets data counter 40 to zero and sets flip flop 36 to provide a qualifying voltage, to its output line 36a, that is applied to and qualifies AND gates 41 and 42. With AND gate 41 qualified, each of the subsequent data pulses derived by sensor 21 and applied to the pulse width discriminator 38, are applied to data counter 40 via line 38b, qualified AND gate 41 and line 41a to provide a digital data output signal or a count of digits D at counter output 41a. Simultaneously, clock pulses derived by sensor 20 are applied to search counter 33 via line 20a, qualified AND gate 42 and line 42a.

The search counter 33 counts the clock pulses and derives a digital number that is compared to the "set" count provided by digits L. When the digits of the counted clock pulse number coincide with the digits of the "set" count, the zero coincidence detector 34 applies a signal to the "reset" inputs of both flip flops 35 and 36 by line 34a. Reset flip flop 35 provides a search complete or a digital output availability signal C in line 35b, and simultaneously de-energizes line 35a to disqualify AND gate 39 to block subsequent reference pulses from discriminator 38. Simultaneously, reset flip flop 36 de-energizes line 36a to disqualify AND gates 41 and 42. Disqualified AND gate 41 blocks subsequent data pulses from discriminator 38 to counter 40 and the commanded digital data output signal D, according to two variables represented by digits K and L, is available. Disqualified AND gate 42 blocks subsequent clock pulses from sensor 20 to search counter 33. With gates 39, 41 and 42 disqualified, and flip flops 35 and 36 reset, the operating sequence of the novel circuit is completed with a final digital data signal D and a search complete signal C available. For subsequent operation, a new search command signal S must be applied to the circuit.

A modified form of scanning means and scanning control means is shown in FIGURE 2 for scanning the storage member 10, as shown in FIGURE 1. In the modified arrangement, the fixed sensor 20 again scans the clock track 11 to derive clock pulses that are transmitted by the sensor output line 20a. However, the movable sensor 21 of FIGURE 1 is replaced by fixed sensors 51, 52, 53, and 54, each being aligned for scanning one of the tracks 13 of member 10. These sensors have been limited in number to facilitate illustration and description of the invention and the number is determined by the number of tracks 13 to be scanned. The sensors 51, 52, 53, and 54 have output lines 51_a_, 52_a_, 53_a_, and 54_a_, respectively, for transmitting the derived data signals to a gated matrix 55 that is connected to the input 30 for receiving the address digis K. The gated matrix 55 has an output line 55_a_ connected to the input of the pulse width discriminator 38. The gate 39 of FIGURE 1, that has three input connections, is now replaced by an AND gate 139 that is connected to the output lines 38_a_ and 35_a_ of the discriminator 38 and the flip flop 35, respectively.

The gated matrix 55 is shown in detail in FIGURE 3 and is comprised of AND gates each identified by a numeral having a suffix A and of NAND or AND-NOT gates each identified by a numeral having a suffix N. The input 30 has four lines 61, 62, 63, and 64, for transmitting respective address digits K1, K2, K3, and K4, that are connected to the inputs of gates 66A, 67N, 68A, and 69N; 71N, 72A, 73A, and 74N; 76N, 77N, 78N, and 79A; and 81N, 82N, 83N and 84N, respectively. The sensor output lines 51_a_, 52_a_, 53_a_, and 54_a_ are connected to the gated matrix output line 55_a_ by series connected gates 66A, 71N, 76N, and 81N; 67N, 72A, 77N, and 82N; 68A, 73A, 78N, and 83N; and 69N, 74N, 79A, and 84N, respectively. The AND gates pass a pulse data signal provided by the sensors only when the associated K address digit applied to its input is high, or the associated address input line is in the "1" state. The NAND or AND-NOT gates pass a data pulse signal provided by the sensors only when the associated K address digit is low or absent, or the associated address input line is in the "0" state.

When the novel encoder of FIGURE 1 includes the modified scanning means and scanning control means of FIGURES 2 and 3, sensors 51, 52, 53, and 54 scan the storage member 10 to derive pulse signals that are transmitted to the matrix 55 by output lines 51_a_, 52_a_, 53_a_, and 54_a_, respectively. The matrix 55 transmits the one pulse signal to its output line 55_a_ that is derived by scanning the track 13 that corresponds to the digital address received at the address input 30. Only one gated transmission line of matrix 55 can transmit data pulse signals at any one time in response to the digital address.

Therefore, it should be readily seen that the novel circuit or encoder having high density stored data provides a digital data output D and an output availability signal C according to address digits K and L representing two variables, and in response to a command signal S.

Although the novel encoder is shown and described as receiving a digital address in parallel and providing a digital output in parallel, it is not restricted thereto. The digital address may be provided in series and would necessitate digital counter means in the encoder to provide digits K to comparator 26 and digits L to gates 32. If the system with which the encoder meshes requires a digital output signal D provided in series instead of in parallel, the signal D is provided by the gate output line 41_a_, and the output availability signal SF will be an output complete signal.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An encoder comprising an input for receiving two variables, a device for storing data in accordance with functions of the variables and having scanning means for providing data and clock signals in accordance with the data, control means connected to the input and to the scanning means to provide data signals corresponding to a function of one variable, and means for transmitting the data and clock signals having means connected to the input for controlling the signal transmission means by comparing the clock signals with the other variable so the transmitted data signals correspond to a function of the two variables.

2. The encoder according to claim 1 which includes a plurality of scanning means each passing a signal corresponding to a function of the variable and the control means comprises a device connecting the transmission means to the scanning means and having means connected to the input for selectively passing one of the signals to the transmitting means in response to the one variable.

3. An encoder comprising an input to receive two variables, a storage member having data in accordance with functions of the variables, servo controlled scanning means connected to the input for searching the member in response to one variable for providing data signals corresponding to a function of the one variable and for providing clock signals, and means connected to the scanning means for transmitting the data and clock signals and having means connected to the input for controlling the signal transmitting means by comparing the clock signals to the other variable so the transmitted data signals correspond to a function of the two variables.

4. An encoder comprising an input to receive two variables, a storage member having data in accordance with functions of the variables, means for scanning the member to provide data signals in accordance with the data and to provide clock signals, control means connected to the input and to the scanning means to selectively provide a data signal corresponding to a function of the one variable, another input to receive a command, and means for transmitting the data and clock signals and having means connected to both inputs for controlling the signal transmitting means to start data and clock signal transmission in response to a command and to stop data and clock signal transmission by comparing the clock signals to the other variable so the data signals correspond to a function of the two variables.

5. An encoder comprising an input to receive an address of digits representing two variables, a storage member having data bits, in accordance with functions of the variables and having clock bits, means for scanning the member to provide data and clock pulses, means connected to the scanning means for deriving a digital number idetifying the data bits being scanned, the scanning means having means connected to the number deriving means and to the input for controlling the scanning means by comparing the digital number and the address digits representing one variable so the data pulses correspond to a function of the one variable, means connected to the scanning means for transmitting the data and clock pulses and having means connected to the input for controlling the transmitting means according to the difference between the clock pulses and the address digits representing the other variable so the data pulses provide a digital signal corresponding to a function of the two variables.

6. An encoder comprising an input to receive an address of digits representing two variables, a storage member having data bits in accordance with functions of the variables and having clock bits, means for scanning the member to provide data and clock pulses and having control means connected to the input for selectively passing the data pulses according to the digits representing one variable so the data pulses correspond to a function of the one variable, and means connected to the control means for transmitting the data pulses to provide a digital signal and being connected to the scanning means for transmitting the clock pulses, the transmitting means having means connected to the input for controlling transmission of the digital signal according to the difference between the clock pulses and the address digits representing the other variable so the digital signal corresponds to a function of the two variables.

7. An encoder comprising an input to receive an address of digits representing two variables, a storage member having parallel tracks of data bits in accordance with functions of the variables and having a track of clock bits, means for scanning the member to provide data pulses according to the data bits of a parallel track and clock pulses according to the clock bits, means connected to the scanning means for deriving a digital number identifying the parallel track being scanned, the scanning means having means connected to the number deriving means and to the input for aligning the scanning means with a parallel track according to the difference between the digital number and the address digits representing one variable so the data pulses correspond to a function of the one variable, another input to receive a command, and means connected to the scanning means for transmitting the data and clock pulses and having control means connected to both inputs for starting transmission in response to a command and for stopping transmission when the clock pulses correspond to the address digits representing the other variable so the data pulses correspond to a function of the two variables.

8. An encoder comprising an input to receive an address of digits representing two variables, a storage member having parallel tracks in accordance with functions of the variables and having a clock track, means for scanning the member to provide data and clock pulses according to the bits of all the tracks and having control means connected to the input for selectively passing data pulses according to the digits representing one variable so the data pulses correspond to a function of the one variable, another input to receive a command, and means connected to the scanning control means for transmitting the data pulses to provide a digital signal and being connected to the scanning means for transmitting the clock pulses, the transmitting means having control means connected to both inputs for starting transmission in response to a command and for stopping transmission when the clock pulses correspond to the address digits representing the other variable so the data pulses correspond to a function of the two variables.

9. An encoder comprising an input to receive an address of digits representing two variables, a storage member having data bits in accordance with functions of the variables and having clock bits, means for scanning the member to provide data and clock pulses, means connected to the scanning means for deriving a digital number identifying the data bits being scanned, the scanning means having means connected to the number deriving means and to the input for controlling the scanning means by comparing the digital number and the address digits representing one variable so the data pulses correspond to a function of the one variable, gate means connected to the scanning means for transmitting pulses when qualified, means connected to the input and to the gate means for counting transmitted clock pulses to provide an output availability signal when the counted clock pulses correspond to the address digits representing the other variable, and control means having an input to receive a command and being connected to the gate means to provide a signal in response to a command for qualifying the gate means to transmit the data pulses and provide a digital signal and to transmit the clock pulses to the counting means, the control means being connected to the counting means for rescinding the qualifying signal in response to an output availability signal to disqualify the gate means and block the pulses so the digital signal corresponds to a function of the two variables.

10. An encoder comprising an input to receive an address of digits representing two variables, a storage member having data bits in accordance with functions of the variables and having clock bits, means for scanning the member to provide data and clock pulses and having first control means connected to the input for selectively passing data pulses according to the digits representing one variable so the data pulses correspond to a function of the one variable, gate means connected to the first control means and to the scanning means for transmitting the data and clock pulses when qualified, means connected to the input and to the gate means for counting transmitted clock pulses to provide an output availability signal when the counted clock pulses correspond to the address digits representing the other variable, and second control means having an input to receive a command and being connected to the gate means to provide a signal in response to a command for qualifying the gate means to transmit the data pulses to provide a digital signal and to transmit the clock pulses to the counting means, the second control means being connected to the counting means for rescinding the qualifying signal in response to an output availability signal to disqualify the gate means and block the pulses so the digital signal corresponds to a function of the two variables.

11. An encoder comprising an input to receive an address of digits representing two variables, a storage member having data bits in accordance with functions of the variables and having a reference bit and clock bits, means for scanning the member to provide data, reference and clock pulses, means connected to the scanning means for deriving a digital number identifying the data bits being scanned, digital comparing means connected to the number deriving means and to the input for providing a scanning control signal corresponding to the difference between the digital number and the address digits representing one variable, the scanning means having means connected to the digital comparing means for controlling the scanning means in response to the scanning control signal so that data pulses correspond to a function of the one variable, pulse discriminating means connected to the scanning means and having a first output for transmitting reference pulses and a second output for transmitting data pulses, gate means connected to the second output of the discriminating means and to the scanning means for transmitting the data and clock pulses when qualified, means connected to the input and to the gate means for counting transmitted clock pulses to provide an output availability signal when the counted clock pulses correspond to the address digits representing the other variable, control means having an input to receive a command for providing a signal in response to a command for qualifying the gate means to transmit the data pulses to provide a digital signal and to transmit the clock pulses to the counting means, the control means being connected to the counting means for rescinding the qualifying signal in response to an output availability signal to disqualify the gate means and block the pulses so the digital signal corresponds to a function of the two variables, and a gate connecting the control means to the gate means being connected to the first output of the discriminating means for applying the qualifying signal to the gate means only when the gate is qualified by a reference signal.

12. An encoder according to claim 11 in which the digital comparing means provides a gate signal when the digital number corresponds to the address digits representing the one variable and has an output connected to the gate for applying the gate signal thereto, and the gate applying a qualifying signal to the gate means only when the gate is qualified by a gate signal and a reference signal.

13. An encoder comprising an input to receive an address of digits representing two variables, a storage member having data bits in accordance with functions of the variables and having a reference bit and clock bits, means for scanning the member to provide data, reference and clock pulses, and having first control means connected to the input for passing reference pulses and for selectively passing data pulses according to the digits representing one variable so that data pulses correspond to a function of the one variable, pulse discriminating means connected to the first control means and having a first output for transmitting reference pulses and a second output for transmitting data pulses, gate means connected to the second output of the discriminating means and to the scanning means for transmitting the data and clock pulses when qualified, means connected to the input and to the gate means for counting transmitted clock pulses to provide an output availability signal when the counted clock pulses correspond to the address digits representing the other variable, second control means having an input to receive a command for providing a signal in response to a command for qualifying the gate means to transmit the data pulses to provide a digital signal and to transmit the clock pulses to the counting means, the second control means being connected to the counting means for rescinding the qualifying signal in response to an output availability signal to disqualify the gate means and block the pulses so the digital signal corresponds to a function of the two variables, and a gate connecting the second control means to the gate means and connected to the first output of the discriminating means for applying a qualifying signal to the gate means only when the gate is qualified by the reference signal.

14. An encoder comprising an input for receiving two variables, a device for storing data in accordance with functions of the variables and having scanning means for providing signals in accordance with the data, control means connected to the input and to the scanning means to provide signals corresponding to a function of one variable and including a device responsive to relative movement between the scanning means and the storage member for deriving a signal identifying the data being scanned, comparing means connected to the input and to the device for providing a control signal corresponding to the difference between the one variable and the identifying signal, means connected to the comparing means for positioning the scanning means relative to the storage member in response to the control signal, and means for transmitting the data signals connected to the input for controlling signal transmission in response to the other variable so the transmitted data signals correspond to a function of the two variables.

15. An encoder comprising an input for receiving two variables, a device for storing data in accordance with functions of the variables and having scanning means for providing signals in accordance with the the data, control means including a gated matrix connected to the scanning means and to the input for selectively passing the signals from the scanning means in response to the one variable to provide signals corresponding to a function of the one variable, and means for transmitting the last-mentioned signals connected to the gated matrix and to the input for controlling signal transmission in response to the other variable so that transmitted signals correspond to a function of the two variables.

References Cited by the Examiner

UNITED STATES PATENTS 2,792,173 5/1957 Schuster ___________ 235—61.6

MALCOLM A. MORRISON, *Primary Examiner.*

IRVING L. SRAGOW, *Examiner.*

L. W. MASSEY, D. W. COOK, *Assistant Examiners.*